(12) United States Patent
Wavomba

(10) Patent No.: US 9,285,932 B1
(45) Date of Patent: Mar. 15, 2016

(54) NEGATIVE TOUCH RECOVERY FOR MUTUAL CAPACITANCE SCANNING SYSTEMS

(75) Inventor: Dennis Wavomba, Nashua, NH (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 283 days.

(21) Appl. No.: 13/429,878

(22) Filed: Mar. 26, 2012

Related U.S. Application Data

(60) Provisional application No. 61/512,794, filed on Jul. 28, 2011.

(51) Int. Cl.
G06F 3/041 (2006.01)
G06F 3/044 (2006.01)

(52) U.S. Cl.
CPC ............. *G06F 3/044* (2013.01); *G06F 3/041* (2013.01)

(58) Field of Classification Search
CPC ....... G06F 3/041; G06F 3/044; G06F 3/0416; G06F 3/0418
USPC .................................. 345/173–175
See application file for complete search history.

(56) References Cited

U.S. PATENT DOCUMENTS

| | | | |
|---|---|---|---|
| 4,733,222 A | 3/1988 | Evans | |
| 5,523,775 A | 6/1996 | Capps | |
| 5,543,590 A | 8/1996 | Gillespie et al. | |
| 5,553,296 A | 9/1996 | Forrest et al. | |
| 7,504,833 B1 | 3/2009 | Seguine | |
| 8,072,230 B1 | 12/2011 | Seguine | |
| 8,395,589 B2 * | 3/2013 | Wisniewski | G06F 3/044 345/173 |
| 2005/0012723 A1 | 1/2005 | Pallakoff | |
| 2007/0296709 A1 * | 12/2007 | GuangHai | 345/173 |
| 2008/0136792 A1 * | 6/2008 | Peng et al. | 345/174 |
| 2008/0143671 A1 * | 6/2008 | Li | 345/156 |
| 2008/0150905 A1 * | 6/2008 | Grivna et al. | 345/173 |
| 2008/0158174 A1 * | 7/2008 | Land et al. | 345/173 |
| 2008/0158182 A1 * | 7/2008 | Westerman | 345/173 |
| 2008/0246723 A1 * | 10/2008 | Baumbach | G06F 3/03547 345/156 |
| 2009/0009195 A1 | 1/2009 | Seguine | |
| 2009/0079444 A1 | 3/2009 | Khapochkin et al. | |

(Continued)

FOREIGN PATENT DOCUMENTS

TW 201015412 A 4/2010

OTHER PUBLICATIONS

Sachin Gupta et al._Designing Reliable Capacitive Touch Interfaces_Dated Sep. 6, 2011_7 pages.

(Continued)

*Primary Examiner* — Kumar Patel
*Assistant Examiner* — Sejoon Ahn
(74) *Attorney, Agent, or Firm* — Morgan, Lewis & Bockius LLP

(57) ABSTRACT

A device stores running baseline measurements and initial baseline measurements for a plurality of touch sensors. The device repeatedly takes measurements from the touch sensors during device operation, and counts a number of positive transitions of the measurements, and counts a number of negative transitions of the measurements, the transitions relative to the stored initial baseline measurements. The device re-initializes the stored initial baseline measurements if and only if the count of negative transitions differs from the count of positive transitions by a predetermined amount (a "negative touch state").

19 Claims, 9 Drawing Sheets

(56) References Cited

U.S. PATENT DOCUMENTS

| | | | |
|---|---|---|---|
| 2010/0060608 A1 | 3/2010 | Yousefpor | |
| 2010/0149127 A1 | 6/2010 | Fisher et al. | |
| 2011/0006832 A1 | 1/2011 | Land et al. | |
| 2011/0012840 A1 | 1/2011 | Hotelling et al. | |
| 2011/0025629 A1* | 2/2011 | Grivna et al. | 345/173 |
| 2011/0175823 A1 | 7/2011 | Vieta | |
| 2011/0216016 A1* | 9/2011 | Rosener | 345/173 |
| 2011/0241907 A1* | 10/2011 | Cordeiro | 341/20 |
| 2013/0176273 A1* | 7/2013 | Li et al. | 345/174 |

OTHER PUBLICATIONS

Search Report for U.S. Appl. No. 13/429,878, Dated Mar. 2012, 12 pages.

The Patent Wars: Apple Reveals New High-End Multi-Touch Technology_Dated Mar. 12, 2010 9 pages.

International Search Report for International Application No. PCT/US08/12393 dated Jan. 8, 2009; 2 pages.

TIPO Office Action for Application No. 097142270 dated May 20, 2014; 3 pages.

USPTO Advisory Action for U.S. Appl. No. 12/260,843 dated Jun. 6, 2012; 3 pages.

USPTO Final Rejection for U.S. Appl. No. 12/260,843 dated Mar. 29, 2012; 18 pages.

USPTO Non-Final Rejection for U.S. Appl. No. 12/260,843 dated Sep. 28, 2011; 13 pages.

USPTO Notice of Allowance for U.S. Appl. No. 12/260,843 dated Sep. 13, 2012; 5 pages.

Written Opinion of the International Searching Authority for International Application No. PCT/US08/12393 mailed Jan. 8, 2009; 5 pages.

* cited by examiner

NEGATIVE TOUCH RECOVERY FOR MUTUAL CAPACITANCE SCANNING SYSTEMS

PRIORITY CLAIM

This application claims priority under 35 U.S.C. 119 to U.S. provisional application No. 61/512,794 filed on Jul. 28, 2011, which is incorporated herein by reference in its entirety.

BACKGROUND

Capacitive sensing is a technology based on capacitive coupling that is used in many different types of sensors, including those to detect and measure proximity, position or displacement, humidity, fluid level, and acceleration. Capacitive sensing may be used as a human interface device (HID) technology, for example to replace the computer mouse. Capacitive touch sensors are used in many devices such as laptop trackpads, digital audio players, computer displays, mobile phones, mobile devices, tablets and others. Capacitive sensors are advantageous for their versatility, reliability and robustness, unique human-device interface and cost reduction over mechanical switches. Technologies such as multi-touch and gesture-based touch screens (i.e., touch pads) are also premised on capacitive sensing.

Mutual capacitive sensors have a capacitor at each intersection of each row and each column. A 12-by-16 array, for example, would have 192 independent capacitors. A voltage is applied to the rows or columns. Bringing a finger or conductive stylus near the surface of the sensor changes the local electric field which reduces the mutual capacitance. The capacitance change at every individual point on the grid can be measured to accurately determine the touch location by measuring the voltage in the other axis. Mutual capacitance allows multi-touch operation where multiple fingers, palms or styli can be accurately tracked at the same time.

Self-capacitance sensors can have the same X-Y grid as mutual capacitance sensors, but the columns and rows operate independently. With self-capacitance, the capacitive load on each column or row is measured using current sensing. This produces a stronger signal than mutual capacitance sensing, but it is unable to resolve accurately more than one finger, which results in "ghosting", or misplaced location sensing The performance of devices employing mutual-capacitance scanning systems may be impacted by the phenomenon of negative touch (also known as anti-touch). Negative touch is a device state that occurs when s sensor scan is "initialized" (meaning that baseline measurements are made) while touches are active on the surface. For the surface portions where the touches are present, a 'negative' effect is created whereby those portions are initialized in a 'no-touch' state with a distorted baseline reading. When the actual touch is removed, a 'touch' state is indicated on that portion of the surface because a large deviation from baseline is measured. This leads to 'stuck touches' and 'dead zones' on the surface.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

Figure 1:
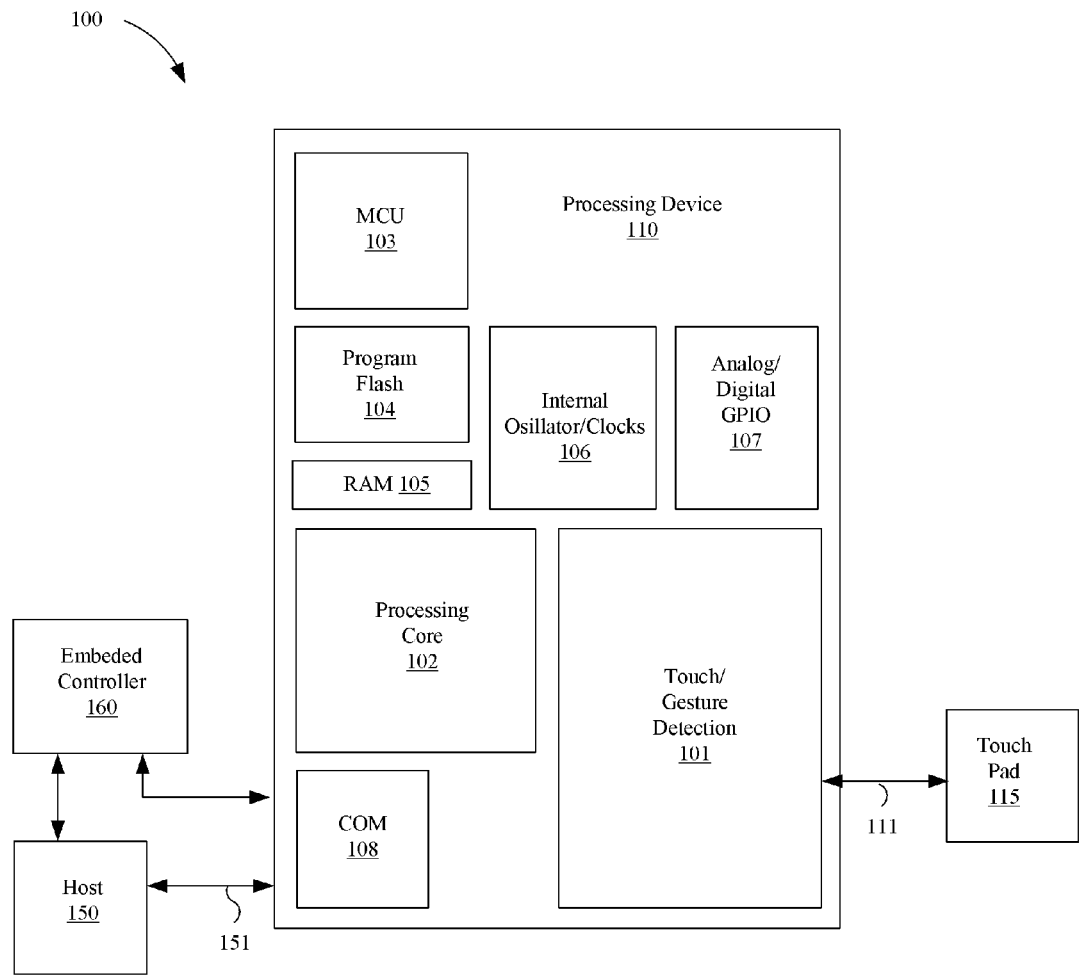
FIG. 1 illustrates a block diagram of one embodiment of an electronic system having a processing device for recognizing a touch or gesture on a touch-sensor pad.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

Herein a "touch" is contact between an external object (e.g., a human finger, a stylus, etc.) and a surface of a touch pad of a data processing/communication device. A "gesture" is one or more touches forming a known spatial pattern or/and a temporal pattern on the touch pad. A "raw count", "raw measurement", or "raw reading" is an analog to digital (ADC) digital output signal corresponding to an analog signal produced by a sensor.

A "running" measurement is a measurement taken and stored repeatedly during device operation. "Device operation" means the device is powered and functioning as designed. "Re-initializing" stored measurements/values means replacing or updating the stored measurements/values with new ones. A "predetermined amount" is a quantity or other value determined and configured into logic before device operation begins. "Current measurements" are measurements taken or being taken at the present moment in time.

Detailed Description of Various Embodiments

A negative touch recovery solution is described that re-utilizes sensor scan measurements without requiring a separate tuning process.

FIG. 1 illustrates a block diagram of one embodiment of an electronic system 100 having a processing device 110 for recognizing a touch or gesture on a touch-sensor pad 115. Each component of the system may be implemented by logic. The electronic system 100 includes a processing device 110, a touch-sensor pad 115, a host processor 150, and an embedded controller 160. Although several components are shown and described, some embodiments of the electronic system 100 may include fewer or more components than are illustrated in FIG. 1.

The processing device 110 may include analog and/or digital general purpose input/output (GPIO) ports 107 such as programmable GPIO ports. The GPIO ports 107 may be coupled to a programmable interconnect and logic (PIL) component (implicit), which acts as an interconnect between the GPIO ports 107 and a digital block array (not shown) of the processing device 110. In one embodiment, the digital block array may be configured to implement a variety of digital logic circuits (e.g., DAC, digital filters, digital control systems, etc.) using configurable user modules (UMs). Additionally, the digital block array may be coupled to an internal system bus (not shown).

The processing device 110 also may include memory such as random access memory (RAM) 105 and program flash 104. In one embodiment, the RAM 105 may be static RAM (SRAM), and the program flash 104 may be non-volatile data storage, which may be used to store firmware (e.g., control algorithms executable by processing core 102 to implement some or all of the operations described herein). The processing device 110 also may include a memory controller unit (MCU) 103 coupled to the memory 104 and 105 and the processing core 102.

The processing device 110 also may include an analog block array (not illustrated), which is coupled to the system bus. The analog block array may be configured to implement a variety of analog circuits (e.g., ADC, analog filters, etc.) using configurable UMs. In one embodiment, the analog block array is coupled to the GPIO 107.

Some embodiments of the processing device 110 include one or more capacitance sensors 101 (also, capsensors 101). Each capsensor 101 may include analog UO such as pins for coupling to a component outside of the processing device 110. For example, the capsensors 101 may be coupled to the touch-sensor pad 115 and/or other devices. The capsensor 101 and processing core 102 are described in more detail below.

It should be noted that the embodiments described herein can be implemented within or used in conjunction with several types of capacitive sensing devices. For example, embodiments may be implemented in touch-sensor pads 115 for notebook computers, for lighting controls, smart phones, and so forth. Similarly, the operations described herein may be implemented in several applications, including notebook cursor operations, lighting controls (e.g., dimmers), volume control, graphic equalizer control, speed control, or other control operations benefiting from gradual adjustments or a convenient touch-sensor interface. Additionally, embodiments may be used in conjunction with non-capacitive sensing elements 170, including but not limited to pick buttons, sliders (e.g., display brightness and contrast), scroll-wheels, multi-media controls (e.g., volume, track advance, etc.), handwriting recognition, and numeric keypad operation.

The electronic system 100 includes a touch-sensor pad 115 coupled to the processing device 110 via a bus 121. The touch-sensor pad 115 may include a multi-dimension sensor array, which includes sensor elements organized in two directions such as in rows and columns.

The electronic system 100 also may include non-capacitance sensor elements (not shown) coupled to the processing device 110. The non-capacitance sensor elements may include buttons, light emitting diodes (LEDs), and other user interface devices such as a mouse, a keyboard, or other functional keys that do not require capacitance sensing. The buses 151 and 121 may be a single bus or configured into any combination of one or more separate buses. The processing device 110 also provide functionality such as keyboard control integration, LEDs, battery charger and general purpose I/O. The non-capacitance sensor elements may be coupled to the GPIO 107.

The illustrated processing device 110 also includes internal oscillator/clocks 106 and a communication block 108. The oscillator/clocks 106 provide clock signals to one or more of the components of processing device 110. The communication block 108 facilitates communications with one or more external components such as the host processor 150 via the host interface (I/F) line 151. Alternatively, the processing block 110 also may be coupled to the embedded controller 160 to communicate with the external components such as the host 150. Interfacing to the host 150 can be through various methods. In one exemplary embodiment, interfacing with the host 150 may be done using a standard PS/2 interface to connect to an embedded controller 160, which in turn sends data to the host 150 via a low pin count (LPC) interface. In some instances, it may be beneficial for the processing device 110 to do both touch-sensor pad and keyboard control operations, thereby freeing up the embedded controller 160 for other housekeeping functions. In another exemplary embodiment, interfacing may be done using a universal serial bus (USB) interface directly coupled to the host 150 via the host interface line 151. Alternatively, the processing device 110 may communicate to external components such as the host 150 using industry standard interfaces such as USB, PS/2, inter-integrated circuit (I2C) bus, or system packet interface (SPI). The host 150 and/or embedded controller 160 may be coupled to the processing device 110 with a ribbon or flex cable from an assembly which houses the touch-sensor pad 115 and processing device 110.

In one embodiment, the processing device 110 is configured to communicate with the embedded controller 160 or the host 150 to send data. The data may be a command or alternatively a signal. In an exemplary embodiment, the electronic system 100 may operate in both standard-mouse compatible and enhanced modes. The standard-mouse compatible mode utilizes the HID class drivers already built into the Operating System (OS) software of the host 150. These drivers enable the processing device 110 and sensing device to operate as a standard cursor control user interface device such as a two-button PS/2 mouse. The enhanced mode may enable additional features such as scrolling (reporting absolute position) or disabling the sensing device such as when a mouse is plugged into the notebook. Alternatively, the processing device 110 may be configured to communicate with the embedded controller 160 or the host 150 using non-OS drivers such as dedicated touch-sensor pad drivers, or other drivers known by those of ordinary skill in the art. In other words, the processing device 110 may operate to communicate data (e.g., commands or signals) using hardware, software, and/or firmware, and the data may be communicated directly to a processing device of the host 150 such as a host processor or, alternatively, may be communicated to the host 150 via drivers of the host 150, such as OS drivers or non-OS drivers. It should also be noted that the host 150 may directly communicate with the processing device 110 via the host interface 151.

In one embodiment, the data sent to the host 150 from the processing device 110 relates to commands including click, double-click, movement of the cursor, scroll-up, scroll-down, scroll-left, scroll-right, step Back, and step Forward. Alternatively, other user interface device commands may be communicated to the host 150 from the processing device 110. These commands may be based on gestures that occur on the sensing device and are recognized by the processing device 110. Exemplary gestures include tap, push, hop, and zigzag gestures. A tap gesture occurs, for example, when a conductive object (e.g., finger) is detected on the sensing device for less than a threshold time. If the time the finger is placed on the touchpad is greater than the threshold time, then the detected gesture may be considered to be a movement of the cursor in one or more directions. Scroll-up, scroll-down, scroll-left, and scroll-right, step back, and step-forward gestures may be detected when the absolute position of the conductive object is within a pre-defined area and movement of the conductive object is detected. Alternatively, other gestures may be recognized. Similarly, signals may be sent that indicate the recognition of operations related to these gestures.

In one embodiment, the processing device 110 may reside on a common carrier substrate such as an integrated circuit (IC) die substrate, a multi-chip module substrate, or the like. Alternatively, the components of the processing device 110 may be one or more separate integrated circuits and/or discrete components. In one exemplary embodiment, the processing device 110 may be a Programmable System on a Chip (PSoC™) processing device, manufactured by Cypress Semiconductor Corporation, San Jose, Calif. Alternatively, the processing device 110 may include one or more other processing devices such as a microprocessor or central processing unit, a controller, special-purpose processor, digital signal processor (DSP), an application specific integrated circuit (ASIC), a field programmable gate array (FPGA), or the like, known by those of ordinary skill in the art. In another embodiment, the processing device 110 may be a network processor having multiple processors including a core unit and multiple microengines. Additionally, the processing device 110 may include any combination of general-purpose processing device(s) and special-purpose processing device(s).

It should also be noted that the embodiments described herein are not limited to having a configuration of a processing device 110 coupled to a host 150, but may include a system that measures the capacitance on the sensing device 115 and sends the raw data to a host computer 150 where it is analyzed by an application. In other words, the processing of the raw data may be done by the processing device 110 and/or the host 150.

In one embodiment, a fully self-contained touch-sensor pad 115 is implemented which outputs fully processed x/y movement and gesture data signals or data commands to a host 150. In another embodiment, a touch-sensor pad 115 is implemented which outputs x/y movement data and also finger presence data to a host 150, and the host 150 processes the received data to detect gestures. In another embodiment, the a touch-sensor pad 115 is implemented which outputs raw capacitance data to a host 150, and the host 150 processes the capacitance data to compensate for quiescent and stray capacitance, as well as calculates x/y movement and detects gestures by processing the capacitance data. In another embodiment, a touch-sensor pad 115 is implemented which processes and outputs capacitance data to compensate for quiescent and stray capacitance to a host 150, and the host 150 calculates x/y movement and detects gestures from the pre-processed capacitance data.

In one embodiment, the electronic system 100 implements a conventional laptop touch-sensor pad 115. Alternatively, the electronic system 100 may be implemented in a wired or wireless keyboard with an integrated touch-sensor pad 115, which is connected to a host 150 via the wired or wireless connection. In such an implementation, the processing described above as being performed by the "host" may be performed in part or in whole by the keyboard controller, which may then pass fully processed, pre-processed or unprocessed data to the system host 150. In another embodiment, the electronic system 100 may be a mobile handset (e.g., cell phone) or other electronic device having a touch-sensor pad 115 which operates in two or more modes. For example, the touch-sensor pad 115 may operate either as a touch-sensor pad 115 for x/y positioning and gesture recognition, or as a keypad or other array of touch-sensor buttons and/or sliders. In other words, a touch-sensor pad 115 may implement touch-sensor buttons and/or sliders at the same time on different areas of the pad 115 or at different times in the same area of the pad 115. The electronic system 100 may be a mobile handset, a personal data assistant (PDA), a television, a remote control, a monitor, a handheld multi-media device, a handheld video player, a handheld gaming device, a control panel, or another type of device.

The capacitance sensor 101 may be integrated into the IC of the processing device 110, or alternatively, in a separate IC. Alternatively, embodiments of the capacitance sensor 101 may be incorporated into other integrated circuits. For example, behavioral level code describing the capacitance sensor 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe the capacitance sensor 101.

In one embodiment, capacitance sensor 101 is a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches, and touch-sensor pads 115 implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches 230 or x/y touch-sensor pads 115, the software may calculate a position of the conductive object to greater resolution than the physical pitch of the switches.

It should be noted that there are various known methods for measuring capacitance. The present embodiments are not limited to using relaxation oscillators, but may include other methods, such as current versus voltage phase shift measurement, resistor-capacitor charge timing, capacitive bridge divider, or charge transfer.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 110. The charge transfer may be conceptually similar to an R-C charging circuit. In this method, $C_p$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 2:
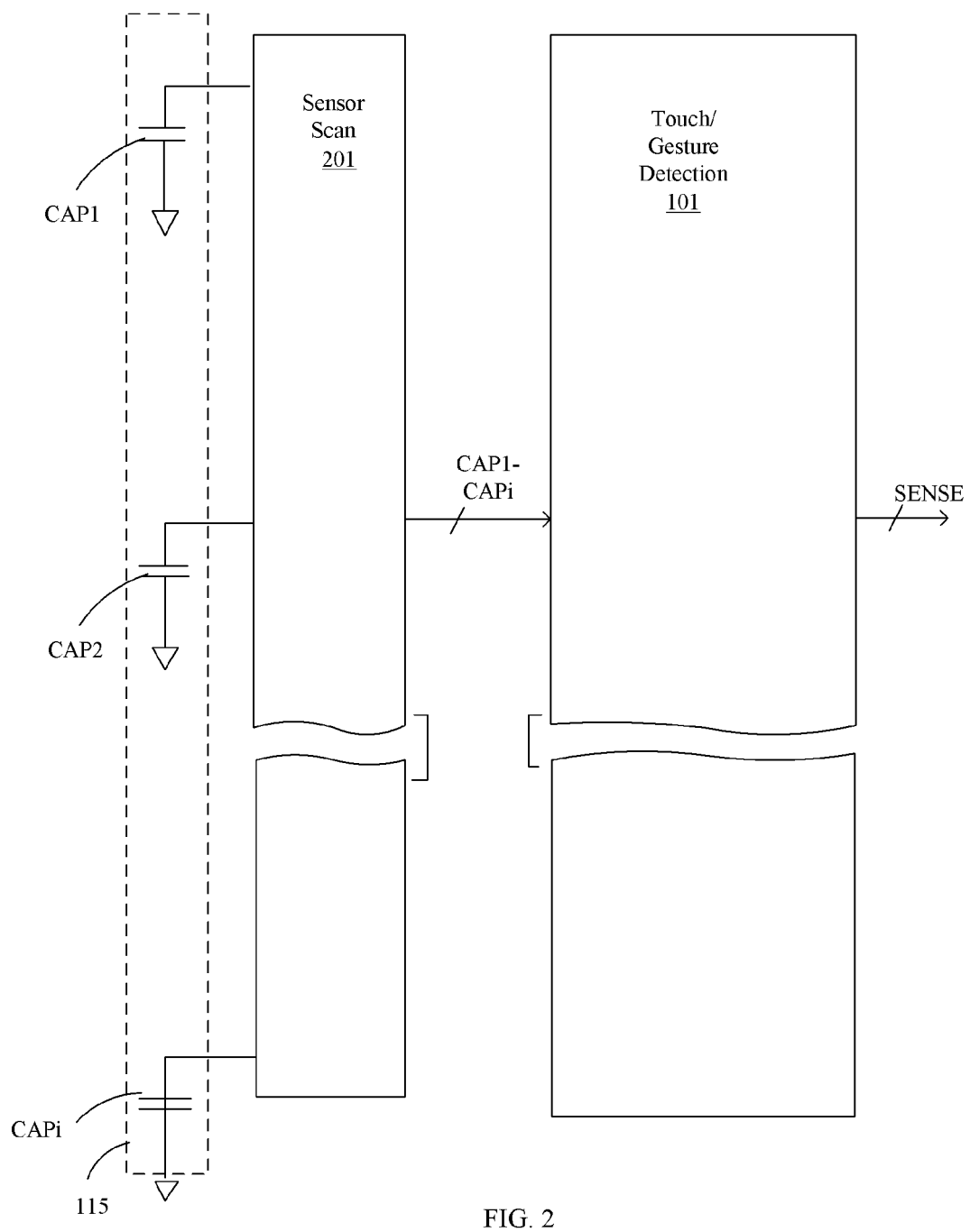
FIG. 2 illustrates an embodiment of touch pad scan and initialization logic.

FIG. 2 illustrates an embodiment of touch pad scan and initialization logic. Scan logic 201 measures each of multiple capacitors (CAP1 . . . CAPi) of the touch pad 115. The measurements may be taken sequentially, or fully or partially in parallel. Each measurement is provided to touch/gesture detection logic 101, which may also operate the scan logic 201 to control the timing and procedure of the sensor scan. The touch/gesture logic 101 analyzes the measurements and produces a SENSE signal indicative of a touch and/or gesture.

Figure 3:
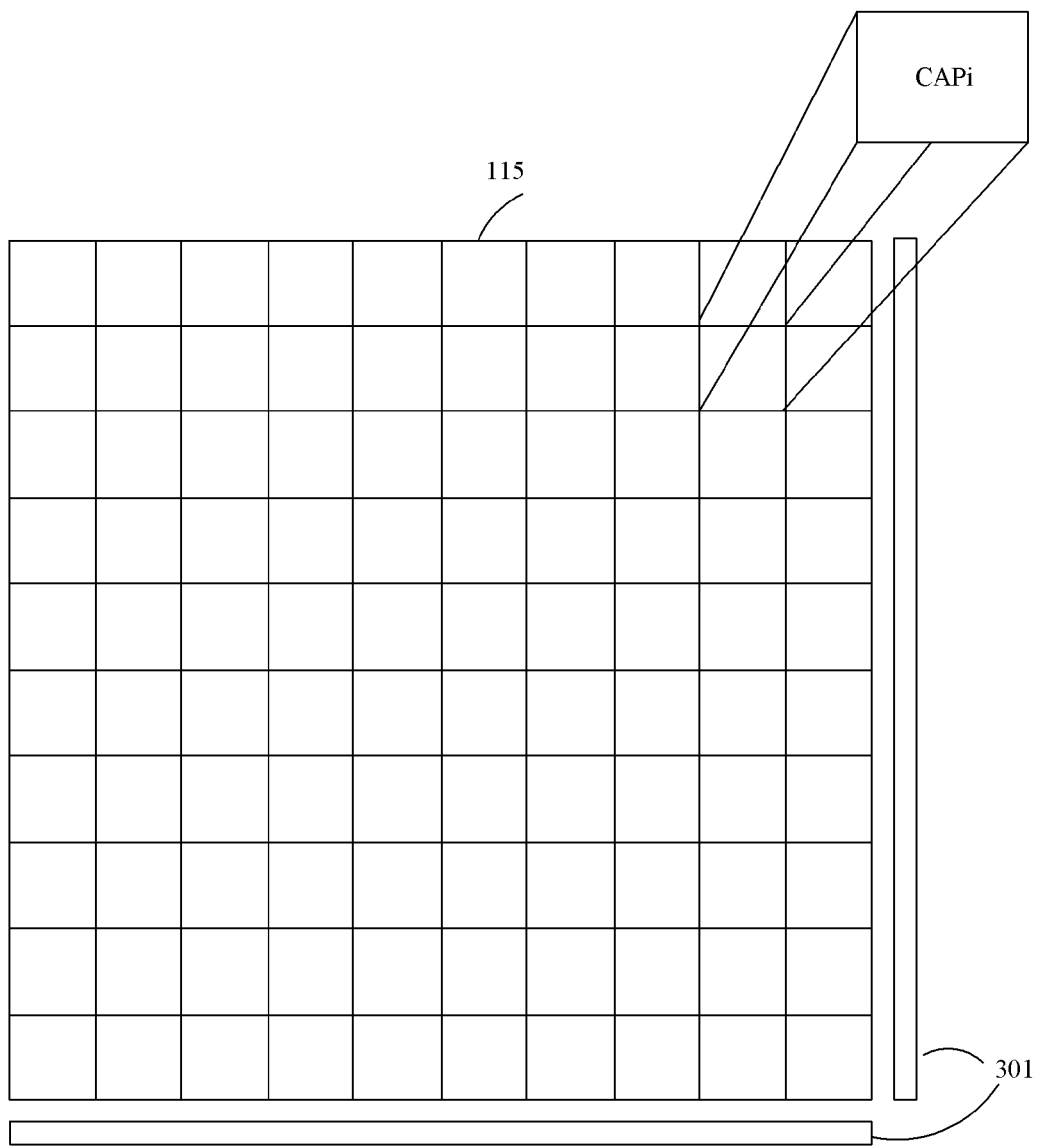
FIG. 3 illustrates an embodiment of touch pad logic.

FIG. 3 illustrates an embodiment of touch pad logic. A plurality of capacitors (CAPi) are arranged in a touch pad grid 115. A particular capacitor of the grid 115 is addressable for purposes of measurement via row and column logic 301. Details of implementing embodiments of the touch pad 115, capacitors CAPi, and row/column address logic 301 are known in the art.

Figure 4A:
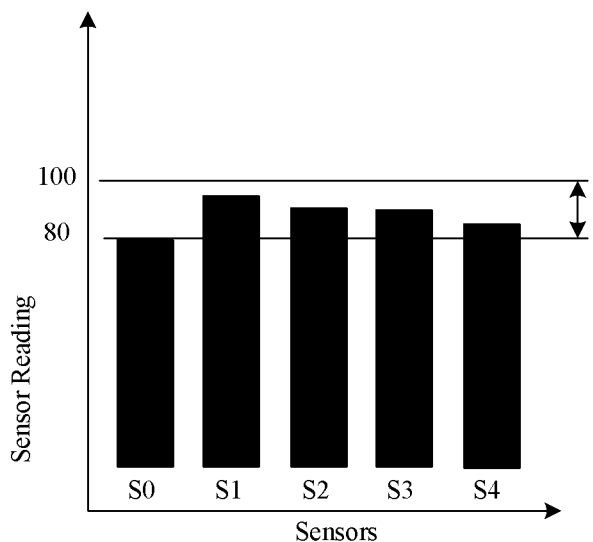
FIG. 4A and FIG. 4B illustrate an exemplary scenario in which touch pad sensor baseline values are established absent the presence of touch on the pad.
Figure 4B:
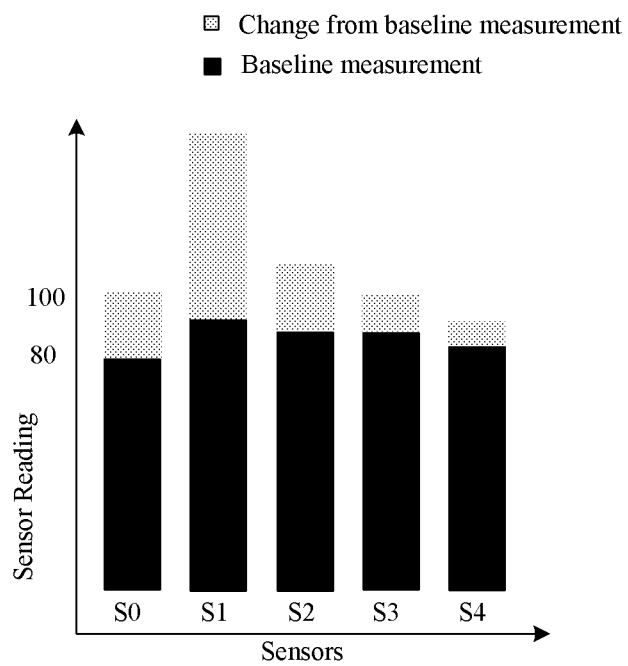

FIG. 4A and FIG. 4B illustrate an exemplary scenario in which touch pad sensor baseline values are established absent the presence of touch on the pad. Baseline values are established by raw measurements in FIG. 4A. The pad is touched (FIG. 4B) resulting in raw measurements that exceed the baseline values by sufficient amounts to trigger SENSE (detection of touch or gesture). The factors affecting SENSE actuation are the current raw measurements from the sensors, and baseline values that they are compared against.

Figure 5A:
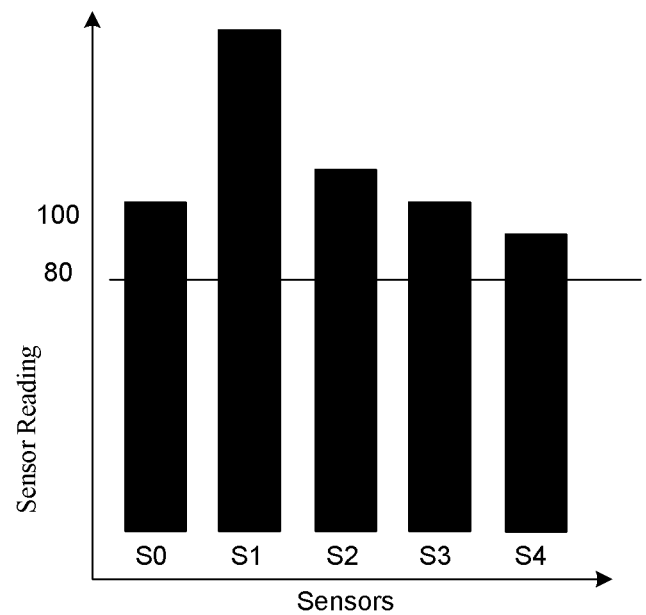
FIG. 5A and FIG. 5B illustrate an exemplary scenario of baseline initialization resulting in a negative touch state.
Figure 5B:
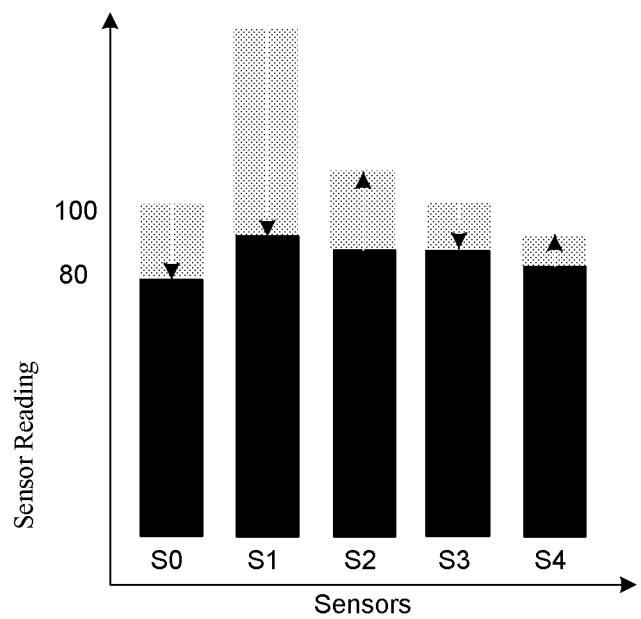

FIG. 5A and FIG. 5B illustrate an exemplary scenario of baseline initialization resulting in a negative touch state. Baseline values are recorded for the sensors of a touch pad (FIG. 5A). The baseline values are skewed due to the presence of touch during baseline measurements. Touch is removed from the pad (FIG. 5B) and a number of the raw measurements drop below baseline values, triggering a SENSE, when in fact no touch or gesture is present on the pad.

Figure 6:
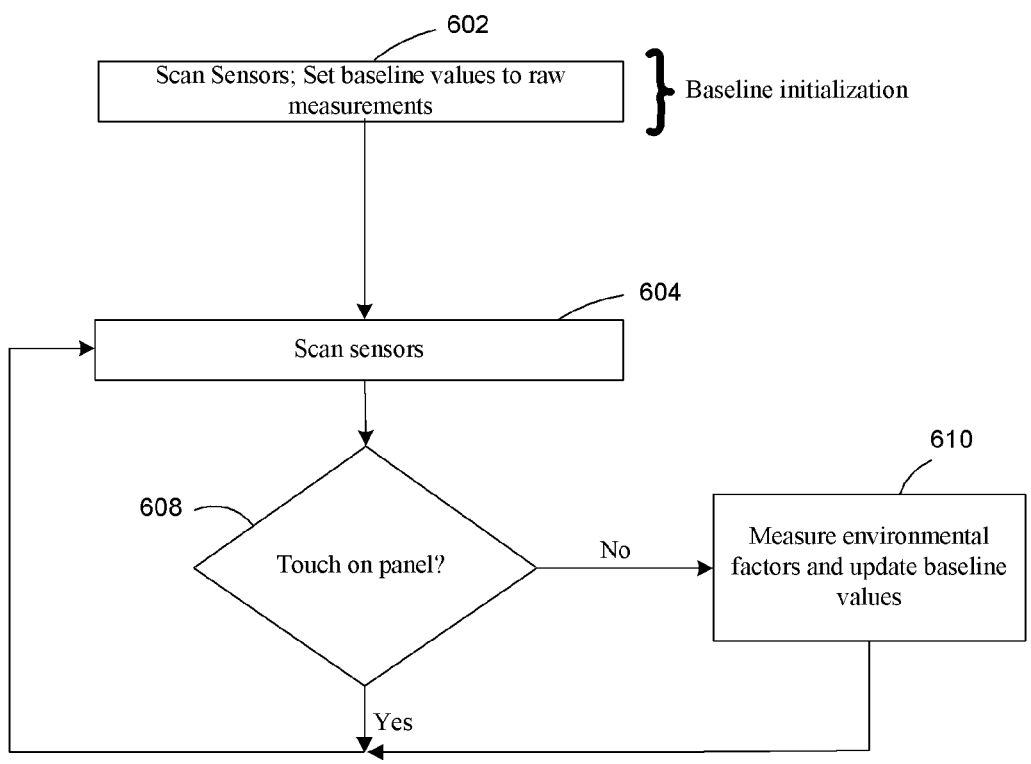
FIG. 6 illustrates an embodiment of baseline value initialization and update.

FIG. 6 illustrates an embodiment of baseline value initialization and update. At 602 baseline values are first established by scanning all sensors on a touch pad (or at least, a subset or multiple subsets of the sensors) and setting baseline values to the raw sensor measurements. Baseline initialization typically occurs at power up of the touch pad, which often takes place when the associated device is powered on, or transitioned from a sleep state to an active state. At 604 the device is operating, and scans of the sensors are periodically made and measurements taken. If a touch or gesture is detected (608, SENSE), appropriate action is taken and scanning of the sensors continues. If no touch is detected, the baseline values are calibrated (610) according to any changes that may have occurred to environmental factors, such as changes in temperature and humidity.

Figure 7:
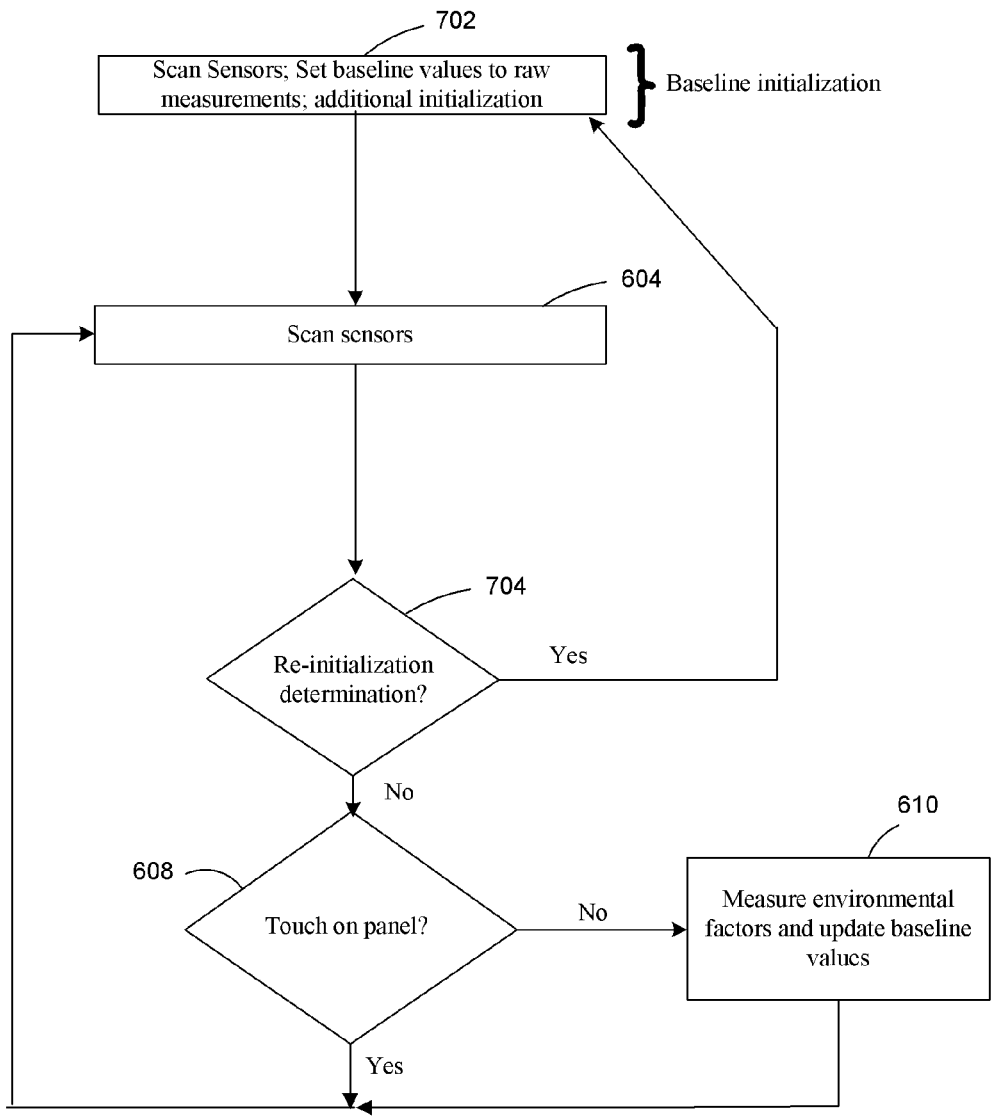
FIG. 7 illustrates an embodiment of a modification to the process of FIG. 6 to provide for negative touch state recovery.

FIG. 7 illustrates an embodiment of a modification to the process of FIG. 6 to provide for negative touch state recovery. Additional initialization is performed (702), and a baseline re-initialization determination is made (704). These additional actions are described in more detail in conjunction with the embodiment illustrated in FIG. 8.

Figure 8:
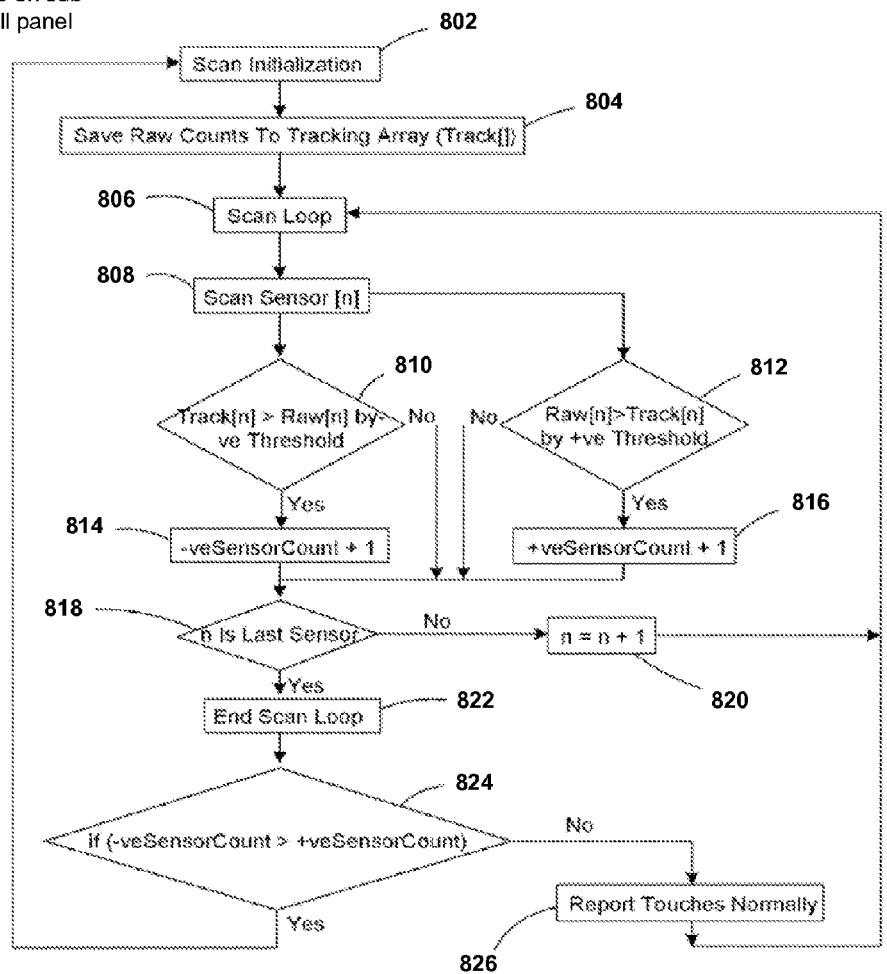
FIG. 8 illustrates an embodiment of a negative touch recovery process.

FIG. 8 illustrates an embodiment of a negative touch recovery process. A baseline initialization is performed at 802. These initial baseline readings are saved at 804, for example to a tracking array. Actions 806, 808, 818, 820 and 822 implement a scan loop across a number n of sensors. Two counts are made during the scan loop. At 810 and 814, a number of sensor readings that differ from the corresponding initial baseline value by a negative threshold amount, or more, are counted. At 812 and 816, a number of sensor readings that differ from the corresponding initial baseline value by a positive threshold amount, or more, are counted. In one embodiment, for both positive and negative variations from the initial baseline value, a variation of 20% of the nominal initial baseline value will trigger an increment to the count. Other embodiments will set the threshold differently, according to the designed environment, sensors, and/or applications. For example, thresholds of 10% or 30% of nominal may be more suitable to different applications. Also, in some applications the positive threshold and negative threshold will be set to different amounts of variation from the initial baseline value. In other words, the thresholds may be asymmetrical to suit the intended application, sensor technology, or environment.

At 824 a comparison is made of the two counts. If the comparison indicates more "negative" sensors, the scan is reinitialized and the process is repeated. If however the comparison indicates more "positive" sensors, touches are reported normally at 826 and the scan loops are repeated for normal operation (without reinitializing).

If normal operation is undertaken (e.g., no negative touch state is detected), the baseline values may be updated, possibly more than once (see FIG. 6, 610). However, the re-initialization determination utilizes the baseline values from the last initialization or re-initialization of the baseline values, even if the baseline values are subsequently updated according to environmental or other factors. Re-initialization may be performed over and over, indefinitely, until the negative touch state is cleared. In other words, in some embodiments there is no time out or exit condition from the baseline re-initialization loop, other than clearing the negative touch state. In some embodiments, including the one illustrated in FIG. 8, re-initialization of baseline values is triggered if the negative count exceeds the positive count at all, even if only by one (1). In other embodiments, re-initialization may be triggered if the negative count comes within a threshold count of the positive count, or the negative count may be required to exceed the positive count by a threshold amount before re-initialization is triggered.

Figure 9A:
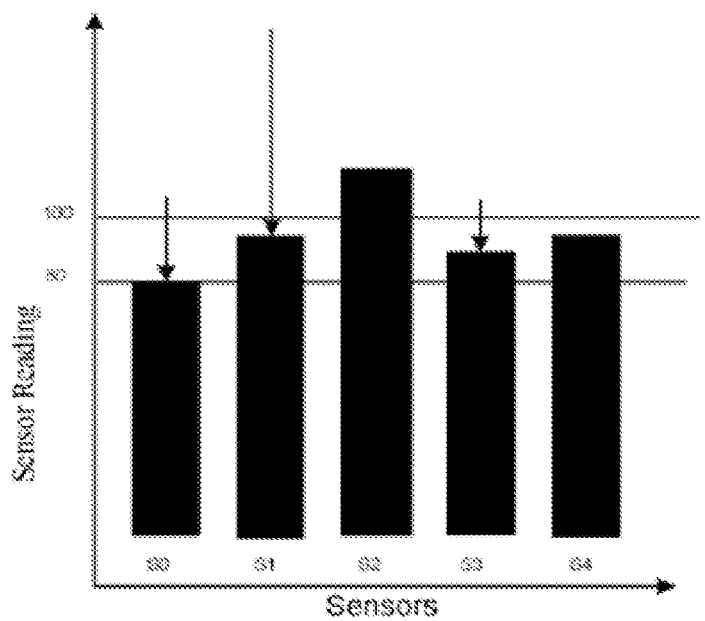
FIGS. 9A and 9B illustrates an example of negative touch recovery by employing the process embodiment of FIG. 8.
Figure 9B:
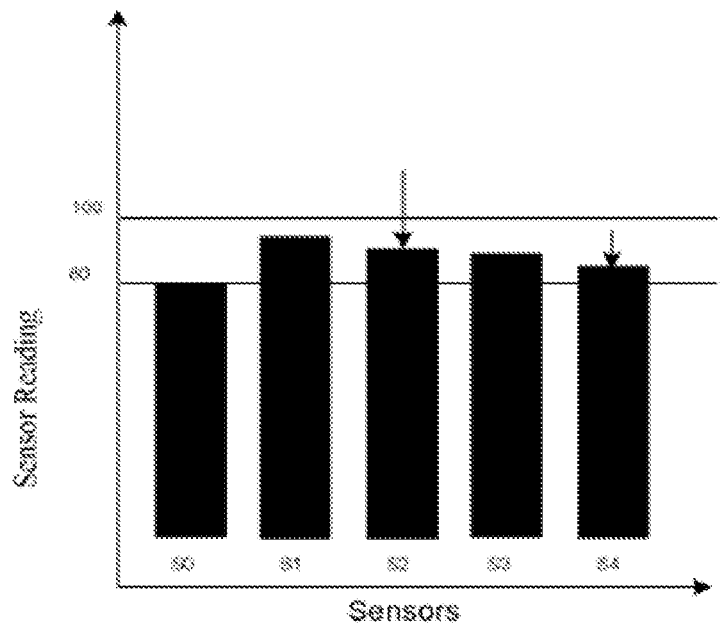

FIGS. 9A and 9B illustrates an example of negative touch recovery by employing the process embodiment of FIG. 8. Baseline values are initialized in a negative touch state due to the presence of touch on the pad at baseline initialization. Touch is removed from three of the sensors in FIG. 9A; one scan cycle later, these sensors are recovered to non-negative touch baseline values. In FIG. 9B, touch is removed from the remaining two sensors that are in a negative touch state, and baseline values for these two sensors are recovered one scan cycle later.

Note that the recovery can take multiple phases depending on the number of sensors covered by touches on initialization. The process takes an accounting of the positive transitions and the negative transitions and determines when to re-initialize baseline values. The execution time of the process is proportional to the time it takes to re-initialize sensor scanning. Therefore, once the touch is fully removed, sensor baseline values will be recovered on the next scan cycle. Multiple recovery cycles that can occur while the touch is being removed from the sensors.

The following table summarizes resource utilization for an embodiment of the process in a device employing a touch panel.

'N'=Number of recovery cycles
TTUM_InitializeBaselines_us=the baseline initialization latency.
The RAM tracking array is 'TTUM_TOTAL_TXRX_NUM' bytes.
The 500 us overhead is for a large panel (20×12=>Tx*Rx) configuration.
For a 16×16 panel (256 nodes), this yields a maximum RAM usage of 264 bytes.

| Parameter/Storage | Usage |
| --- | --- |
| Flash | 383 Bytes |
| RAM | (8 + TTUM_TOTAL_TXRX_NUM) Bytes |
| Fixed Runtime Overhead | <500 us |
| Recovery | ~(N * TTUM_InitializeBaselines_us) |

Implementations and Alternatives

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed.

"Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.}}

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A mobile communication device, comprising:
a touch-sensitive surface having a circuit configured for:
storing running baseline capacitance measurements and initial baseline capacitance measurements for a plurality of touch sensors of the touch-sensitive surface;
repeatedly taking capacitance measurements from the touch sensors during device operation, counting a number of positive transitions of the measurements, and counting a number of negative transitions of the measurements, wherein each positive transition includes capacitance measurements exceeding the stored initial baseline measurements by a predetermined first threshold amount, each negative transition includes capacitance measurements falling below the stored initial baseline measurements by a predetermined second threshold amount, and the predetermined first and second threshold amounts are specified independently;
determining that the count of negative transitions differs from the count of positive transitions by a predetermined amount; and
in response to determining that the count of negative transitions differs from the count of positive transitions by the predetermined amount, re-initializing the stored initial baseline capacitance measurements.

2. The mobile device of claim 1, wherein the circuit is further configured for:
continually altering the stored running baseline capacitance measurements during device operation, while maintaining the stored initial baseline capacitance measurements unaltered until a negative touch state is determined.

3. The mobile device of claim 1,
wherein the circuit is further configured for re-initializing the stored initial baseline capacitance measurements if and only if the count of negative transitions exceeds the count of positive transitions by a threshold amount.

4. The mobile device of claim 2,
wherein the circuit is further configured for continually altering the stored running baseline capacitance measurements during device operation according to changing environmental factors, while maintaining the stored initial baseline capacitance measurements unaltered until a negative touch state is determined.

5. The device of claim 4, wherein the circuit is further configured for determining
a touch or gesture by comparing current sensor measurements with the running baseline capacitance measurements, while determining if a negative touch state is present using the stored initial baseline capacitance measurements.

6. The device of claim 1,
wherein the circuit is further configured for continually re-initializing the stored initial baseline capacitance measurements until a negative touch state is cleared.

7. A device comprising a touch-sensitive surface having a circuit configured for:
storing running baseline capacitance measurements and initial baseline capacitance measurements for a plurality of touch sensors;
repeatedly taking capacitance measurements from the touch sensors during device operation, counting a number of positive transitions of the measurements, and counting a number of negative transitions of the measurements, wherein each positive transition includes capacitance measurements exceeding the stored initial baseline measurements by a predetermined first threshold amount, each negative transition includes capacitance measurements falling below the stored initial baseline capacitance measurements by a predetermined second threshold amount, and the predetermined first and second threshold amounts are specified independently; and
detecting a negative touch state in which the count of negative transitions differs from the count of positive transitions by a predetermined amount; and
in response to detecting the negative touch state, re-initializing the stored initial baseline capacitance measurements.

8. The device of claim 7, wherein the circuit is further configured for
continually altering the stored running baseline capacitance measurements during device operation, while maintaining the stored initial baseline capacitance measurements unaltered until a negative touch state is determined.

9. The device of claim 7,
wherein the circuit is further configured for re-initializing the stored initial baseline capacitance measurements if and only if the count of negative transitions exceeds the count of positive transitions by a threshold amount.

10. The device of claim 8,
wherein the circuit is further configured for continually altering the stored running baseline capacitance measurements during device operation according to changing environmental factors, while maintaining the stored initial baseline capacitance measurements unaltered until a negative touch state is determined.

11. The device of claim 10, wherein the circuit is further configured for
determining a touch or gesture by comparing current sensor measurements with the running baseline capacitance measurements, while determining if a negative touch state is present using the stored initial baseline capacitance measurements.

12. The device of claim 7,
wherein the circuit is further configured for continually re-initializing the stored initial baseline capacitance measurements until a negative touch state is cleared.

13. A method performed at a touch-sensitive device with a plurality of touch sensors, comprising:
upon transitioning the touch-sensitive device from a sleep state to an active state, scanning the plurality of touch sensors to establish baseline capacitance measurements;
after transitioning the touch-sensitive device from the sleep state to the active state:
storing running baseline capacitance measurements and initial baseline capacitance measurements for the plurality of touch sensors;
repeatedly taking capacitance measurements from the touch sensors during operation of the touch-sensitive device, counting a number of positive transitions of the capacitance measurements, and counting a number of negative transitions of the capacitance measurements, wherein each positive transition includes capacitance measurements exceeding the stored initial baseline capacitance measurements by a predetermined first threshold amount, each negative transition includes capacitance measurements falling below the stored initial baseline capacitance measurements by a predetermined second threshold amount, and the first and second threshold amounts are asymmetrical;
determining that the count of negative transitions differs from the count of positive transitions by a predetermined amount; and
in response to determining that the count of negative transitions differs from the count of positive transitions by a predetermined amount, re-initializing the stored initial baseline capacitance measurements.

14. The method of claim 13, further comprising:
continually altering the stored running baseline capacitance measurements during operation of the touch-sensitive device, while maintaining the stored initial baseline capacitance measurements unaltered until a negative touch state is determined.

15. The method of claim 13, further comprising:
re-initializing the stored initial baseline capacitance measurements if and only if the count of negative transitions exceeds the count of positive transitions by a threshold amount.

16. The method of claim 14, further comprising:
continually altering the stored running baseline capacitance measurements during operation of the touch-sensitive device according to changing environmental factors, while maintaining the stored initial baseline capacitance measurements unaltered until a negative touch state is determined.

17. The method of claim 16, further comprising:
determining a touch or gesture by comparing current sensor capacitance measurements with the running baseline capacitance measurements, while determining if a negative touch state is present using the stored initial baseline capacitance measurements.

18. The method of claim 13, wherein the predetermined first and second threshold amounts are set according to design environment, sensor type, and application.

19. The method of claim 13, wherein repeatedly taking measurements from the touch sensors during operation of the touch-sensitive device includes continually scanning for subsequent capacitance measurements after taking a first capacitance measurement.

* * * * *